United States Patent
Hung

(10) Patent No.: US 9,726,538 B2
(45) Date of Patent: Aug. 8, 2017

(54) APPARATUS AND METHOD FOR SENSING PARAMETERS USING FIBER BRAGG GRATING (FBG) SENSOR AND COMPARATOR

(71) Applicant: OPTILAB, LLC, Phoenix, AZ (US)

(72) Inventor: Henry H. Hung, Phoenix, AZ (US)

(73) Assignee: OPTILAB, LLC, Phoenix, AZ (US)

( * ) Notice: Subject to any disclaimer, the term of this patent is extended or adjusted under 35 U.S.C. 154(b) by 276 days.

(21) Appl. No.: 14/513,458

(22) Filed: Oct. 14, 2014

(65) Prior Publication Data

US 2016/0103017 A1 Apr. 14, 2016

(51) Int. Cl.
G01J 1/42 (2006.01)
G01J 3/02 (2006.01)
G01J 3/42 (2006.01)
G01L 1/24 (2006.01)
G01K 11/32 (2006.01)
G01J 3/28 (2006.01)

(52) U.S. Cl.
CPC .......... G01J 3/0218 (2013.01); G01J 3/0245 (2013.01); G01J 3/42 (2013.01); G01K 11/3206 (2013.01); G01L 1/246 (2013.01); G01J 2003/2859 (2013.01); G01J 2003/425 (2013.01)

(58) Field of Classification Search
CPC .......... G01J 3/0218; G01J 3/42; G01J 3/0245; G01K 11/3206; G01L 1/246
USPC .................................................... 250/227.11
See application file for complete search history.

(56) References Cited

U.S. PATENT DOCUMENTS

| 5,267,016 | A | * | 11/1993 | Meinzer | G01S 17/32 356/3 |
|---|---|---|---|---|---|
| 2005/0134861 | A1 | * | 6/2005 | Kringlebotn | G01J 3/28 356/480 |
| 2007/0280703 | A1 | * | 12/2007 | Taverner | G01J 3/02 398/195 |
| 2009/0195780 | A1 | * | 8/2009 | Palmskog | G01N 21/314 356/437 |
| 2013/0222811 | A1 | * | 8/2013 | Handerek | G01M 11/3127 356/477 |
| 2014/0152995 | A1 | * | 6/2014 | Dong | G01L 1/246 356/477 |

* cited by examiner

Primary Examiner — Georgia Y Epps
Assistant Examiner — Kevin Wyatt
(74) Attorney, Agent, or Firm — Loza & Loza, LLP; George L. Fountain

(57) ABSTRACT

Various implementations of an apparatus for sensing one or more parameters are disclosed herein. The apparatus includes a sweeping wavelength laser configured to generate a sweeping wavelength optical signal; an optical fiber including a Fiber Bragg Grating (FBG) structure configured to sense a parameter, wherein the optical fiber is configured to receive the sweeping wavelength optical signal, wherein the FBG structure is configured to produce a reflected optical signal with a particular wavelength in response to the sweeping wavelength optical signal, and wherein the particular wavelength varies as a function of the parameter; a photo detector configured to generate an electrical signal based on the reflected optical signal; a comparator configured to generate a pulse based on a comparison of the electrical signal to a threshold; and a processor configured to generate an indication of the parameter based on the pulse. The comparator may be configured as a Schmitt trigger.

16 Claims, 6 Drawing Sheets

APPARATUS AND METHOD FOR SENSING PARAMETERS USING FIBER BRAGG GRATING (FBG) SENSOR AND COMPARATOR

FIELD

The present disclosure relates generally to optical measurement apparatuses, and in particular, to an apparatus and method for sensing parameters using Fiber Bragg Grating (FBG) sensor and comparator.

BACKGROUND

Many monitoring and control systems employ a plurality of sensors for measuring different parameters associated with a system. For instance, such sensed parameters include temperature, mechanical strain, pressure, as well as other. Traditionally, such sensors use mechanical and electrical principles for performing parameter sensing and measurement. For example, traditional temperature sensors employ thermocouples, thermistors, resistance temperature detectors (RTDs), and infrared sensors. Similarly, traditional strain sensors may include strain gauges, piezo-resistive pressure sensors, and capacitive pressure sensors.

Although such traditional sensors are useful in many applications, in other applications, such sensors may not be suitable. For instance, in applications where the sensing environment is harsh, such traditional sensors may not be suitable since they may degrade over time, or not work at all. For instance, in an underwater application, electronic-based sensors may not be suitable as the water generally causes shorts in the electronic components. Other harsh environments include corrosive environments, radiation environments, harsh chemical environments, high and low temperature environments, vacuum environments, and others potentially in combination.

One type of sensor useful for harsh environment sensing is an optical-based sensor that employs a Fiber Bragg Grating (FBG). A FBG sensor typically comprises an optical fiber that includes one or more FBG structures formed within the fiber. Each FBG structure is configured to reflect light at a particular wavelength (e.g., a narrowband wavelength range) and pass through light at other wavelengths. The FBG structure is sensitive to temperature (e.g., the structure expands and contracts with increasing and decreasing temperature, respectively) and to mechanical strain (e.g., the structure expands and contracts with strain). Accordingly, the wavelength of the optical signal that the FBG structure reflects depends on the stressed induced from applied strain, either caused by temperature and/or externally applied forces.

In the past, FBG-based sensors used a system to convert the reflected wavelength into a particular time of receiving the reflected signal. Accordingly, the time of receiving the signal is a function of the wavelength which, in turn, is a function of the sensed parameter (e.g., temperature, strain, pressure, etc.). Typically, such sensors employ a complex process for determining the time of receiving the reflected signal, which consists of converting the reflected optical signal into an electrical signal, digitizing the electrical signals, and performing an algorithm on the digitized signal for determining the peak of the signal. Such complex peak-searching algorithm and analog-to-digital conversion electronics generally limit the speed in which measurements may be made, as well as the number of FBG structures that may be employed on a single optical fiber.

SUMMARY

An aspect of the disclosure relates to an apparatus, such as a sensor or an apparatus that includes a sensor, for sensing one or more parameters. The apparatus comprises a sweeping wavelength laser (SWL) configured to generate a sweeping wavelength optical signal. Additionally, the apparatus comprises an optical fiber including a Fiber Bragg Grating (FBG) structure configured to sense a parameter, wherein the optical fiber is configured to receive the sweeping wavelength optical signal, wherein the FBG structure is configured to produce a reflected optical signal with a particular wavelength in response to the sweeping wavelength optical signal, and wherein the particular wavelength varies as a function of the parameter. The apparatus further comprises a photo detector configured to generate an electrical signal based on the reflected optical signal, a comparator configured to generate a pulse based on a comparison of the electrical signal to a first threshold, and a processor configured to generate an indication of the parameter based on the pulse.

In another aspect of the disclosure, the comparator is configured to generate the pulse by producing a high logic level in response to the electrical signal from the photo detector exceeding the first threshold. In another aspect, the comparator is configured to generate the pulse by at least producing a high logic level in response to the electrical signal rising above the first threshold, and producing a low logic level in response to the electrical signal falling below a second threshold. In yet another aspect, the comparator comprises a Schmitt trigger.

In another aspect of the disclosure, the indication of the parameter is based on a timing at which the processor receives the pulse. In another aspect, the apparatus further comprises a scan generator configured to generate a scan signal for controlling the sweeping wavelength optical signal. In still another aspect, the processor is configured to generate the indication of the parameter based on the scan signal and the pulse. In an additional aspect, the sweeping wavelength laser (SWL) comprises a light source configured to generate a light having a defined range of wavelengths, and a tunable filter configured to generate the sweeping wavelength optical signal by wavelength filtering the light in accordance with the scan signal. In a further aspect, the SWL may further include an optical amplifier to increase the level of the light generated by the light source.

In another aspect of the disclosure, the apparatus further comprises a second optical fiber including a second FBG structure configured to sense a second parameter, wherein the second optical fiber is configured to receive the sweeping wavelength optical signal, wherein the second FBG structure is configured to produce a second reflected optical signal with a second particular wavelength in response to the sweeping wavelength optical signal, and wherein the second particular wavelength varies as a function of the second parameter. Additionally, the apparatus comprises a second photo detector configured to generate a second electrical signal based on the second reflected optical signal, and a second comparator configured to generate a second pulse based on a comparison of the second electrical signal to a second threshold. In yet another aspect, the processor is configured to generate a second indication of the second parameter based on the second pulse. In still another aspect, the processor is configured to generate the indication of the parameter based on the second pulse.

In another aspect of the disclosure, the optical fiber includes other one or more FBG structures for sensing other one or more parameters, wherein the other one or more FBG structures are configured to produce other one or more reflected optical signals with other one or more particular wavelengths in response to the sweeping wavelength optical signal, and wherein the other one or more particular wavelengths varies as a function of other one or more parameters, respectively. According to this aspect, the photo detector is configured to generate other one or more electrical signals based on the other one or more reflected optical signals, respectively; the comparator is configured to generate other one or more pulses based on a comparison of the other one or more electrical signals to the first threshold; and the processor is configured to generate other one or more indications of the other one or more parameters based on the other one or more pulses, respectively.

Other aspects, advantages and novel features of the present invention will become apparent from the following detailed description of the invention when considered in conjunction with the accompanying drawings.

DETAILED DESCRIPTION OF THE EXEMPLARY EMBODIMENTS

Figure 1A:
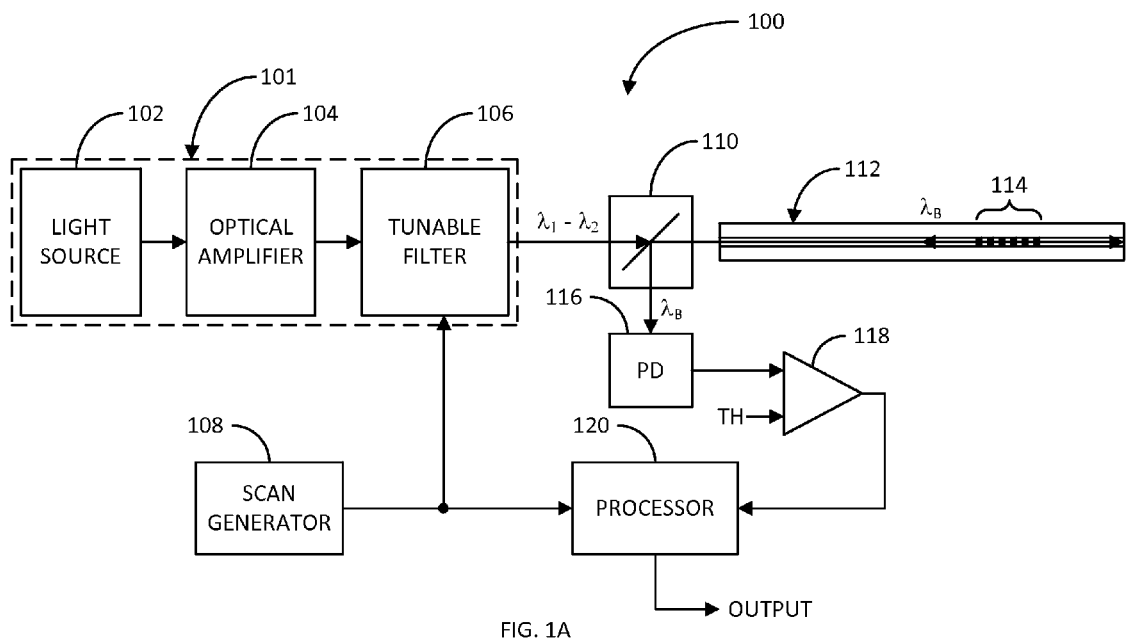
FIGS. 1A-1B illustrate a block diagram of an exemplary apparatus and associated signal timing diagram in accordance with an aspect of the disclosure.

FIG. 1A illustrates a block diagram of an exemplary apparatus 100 in accordance with an aspect of the disclosure. In summary, the apparatus 100 includes a comparator for digitizing a reflected optical signal from a Fiber Bragg Grating (FBG) structure formed within an optical fiber. The use of a comparator, instead of a complex peak-searching algorithm, allows the determination of the time of arrival of the reflected optical signal to be performed substantially faster and with greater accuracy and precision. This allows the apparatus 100 to perform higher quality measurements at substantially greater rates, as well as to employ substantially more FBG structures for sensing many parameters of a system.

In particular, the apparatus 100 comprises a swept wavelength laser (SWL) 101, which may comprise a light source 102, an optical amplifier 104, and a tunable filter 106. The apparatus 100 also comprises a scan generator 108 for generating a scan signal for the SWL 101, as discussed in more detail herein. The apparatus 100 further comprises a coupler 110, and an optical fiber 112, which includes at least one FBG structure 114. Additionally, the apparatus 100 comprises a photo detector (PD) 116, a comparator 118, and a processor 120 configured to process any reflected wavelength signal from FBG structure 114.

The SWL 101 is configured to generate an optical signal having a wavelength that is periodically and continuously swept between a minimum wavelength $\lambda_1$ and a maximum wavelength $\lambda_2$. In particular, the light source 102 generates a broadband optical signal with wavelengths at least between the minimum wavelength $\lambda_1$ and a maximum wavelength $\lambda_2$ of the sweeping optical signal. The optical amplifier 104 amplifies the broadband optical signal to a defined power level suitable for performing parameter measurements using the optical fiber 112. The tunable filter 106 filters the amplified broadband optical signal based on a scan signal generated by the scan generator 108 in order to produce the sweeping optical signal (e.g., SWL of FIG. 1B).

The sweeping optical signal ($\lambda_1$-$\lambda_2$) is applied to an input end of the optical fiber 112 by way of the coupler 110. The sweeping optical signal propagates within the optical fiber 112 towards the other end of the optical fiber. As previously discussed, the FBG structure 114 of the optical fiber 112 reflects the incident optical signal at a particular wavelength $\lambda_B$ (e.g., the Bragg wavelength), and passes other wavelengths of the sweeping optical signal. The reflected optical signal $\lambda_B$ propagates back to the input end of the optical fiber 112 and to the coupler 110, where it directs the reflected optical signal $\lambda_B$ to the photo detector 116.

The photo detector 116 generates an electrical signal based on the reflected optical signal $\lambda_B$. The electrical signal from the photo detector 116 is applied to the comparator 118, where it compares the electrical signal to a defined threshold (TH). It shall be understood that additional components may be provided to process the electrical signal from the photo detector 116 before the electrical signal is applied to the comparator 118. Such additional components may include an amplifier for amplifying the electrical signal and a filter for removing noise from the electrical signal. The comparator 118 generates a signal including a high logic-level if the electrical signal from the photo detector 116 exceeds the threshold (TH), and a low logic-level signal if the electrical signal from the photo detector 116 does not exceed the threshold (TH).

The processor 120 receives the scan signal from the scan generator 108 and the signal from the comparator 118. The scan signal is processed to establish the time of the start of the wavelength scan, and the signal from the comparator 118 indicates the time of arrival of the reflected optical signal. Thus, the processor 120 is able to determine the wavelength $\lambda_B$ of the reflected optical signal based on the time elapsed from the start of the wavelength scan and the rising edge of the asserted signal from the comparator 118. Since, as previously discussed, the wavelength $\lambda_B$ of the reflected optical signal depends on the parameter being sensed by the FBG structure 114 (e.g., temperature, strain, pressure, etc.), the processor 120 is able to generate an indication or output indicative of the sensed parameter based on the determined wavelength $\lambda_B$.

Figure 1B:
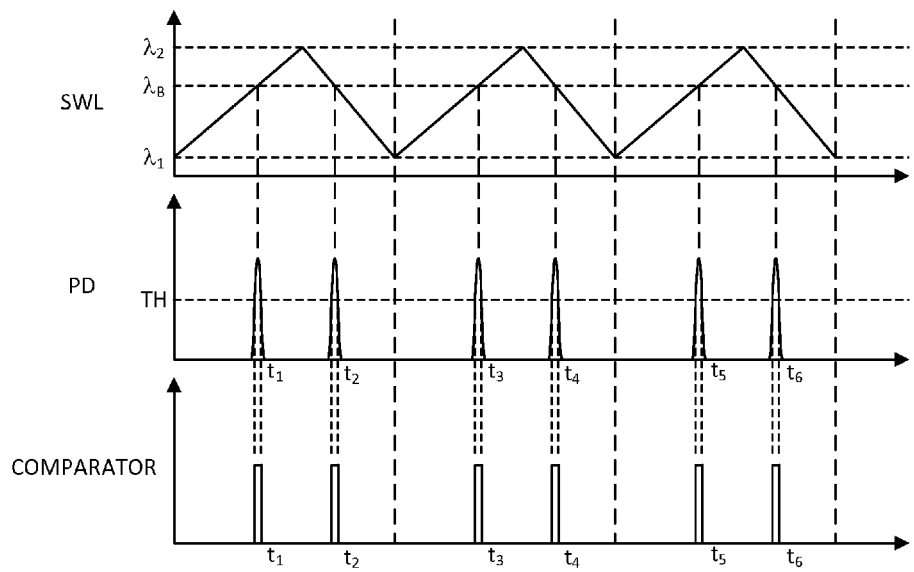

FIG. 1B illustrates a timing diagram of the signals associated with the operation of the apparatus 100 in accordance with another aspect of the disclosure. The upper graph is a timing diagram of an exemplary scan signal generated by the scan generator 108. The middle diagram is a timing diagram of an exemplary electrical signal generated by the photo detector 116. And, the lower graph is a timing diagram of an exemplary signal generated by the comparator 118.

According to the upper graph, the scan signal generated by the scan generator 108 may be triangular- or sawtooth like. That is, the scan signal includes a substantially linear rising portion and a substantially linear falling portion. The slope of the rising portion may be not the same as the slope of the falling portion. The rising portion of the scan signal causes the SWL 101 to generate an optical signal with a wavelength linearly increasing from the minimum wavelength $\lambda_1$ to the maximum wavelength $\lambda_2$. Similarly, the falling portion of the scan signal causes the SWL 101 to generate an optical signal with a wavelength linearly decreasing from the maximum wavelength $\lambda_2$ to the minimum wavelength $\lambda_1$. Also, as shown, the scan signal may be continuous and periodic; the graph illustrating three (3) periods of the scan signal. It shall be understood that the scan signal may be configured differently including a non-linear rise and linear fall, a linear rise and a non-linear fall, a non-linear rise and fall, and other variations.

As illustrated, the middle graph depicts the electrical signal generated by the photo detector 116 in response to receiving the optical signal reflected by the FBG structure 114 of the optical fiber 112. As previously discussed, the wavelength $\lambda_B$ of the reflected optical signal depends on the configuration of the FBG structure 114 as well as the one or more parameters that it is sensing. Because the scan signal is rising and falling between the minimum and maximum wavelengths $\lambda_1$ and $\lambda_2$ in a defined (predictable) manner, the time of arrival of the reflected optical signal may be mapped to the particular wavelength $\lambda_B$ of the reflected optical signal. Thus, in this example, the times $t_1$ and $t_2$ in the first period corresponds to the wavelength $\lambda_B$, the times $t_3$ and $t_4$ in the second period corresponds to the wavelength $\lambda_B$, and the times $t_5$ and $t_6$ in the third period corresponds to the wavelength $\lambda_B$.

With reference to the middle and lower graphs, the comparator 118 compares the electrical signal from the photo detector 116 with a defined threshold (TH), and generates a high logic-level signal if the electrical signal exceeds the threshold, and a low logic-level signal if the electrical signal does not exceed the threshold. Thus, the lower graph illustrates the signal generated by the comparator 118, which includes substantially square-wave pulses that coincides with times $t_1$ to $t_6$, all of which coincide with the wavelength $\lambda_B$ of the reflected optical signal.

The processor 120 receives the signal from the comparator 118 and maps the timings $t_1$ to $t_6$ to the wavelength $\lambda_B$ (or wavelengths $\lambda_{B1}$ to $\lambda_{B6}$, as the wavelength may vary over time depending on the sensed parameter) of the reflected optical signal using the scan signal received from the scan generator 108. As previously discussed, the wavelength $\lambda_B$ of the reflected optical signal depends on the one or more parameters being sensed by the FBG structure 114 of the optical fiber 112, which may vary over time. Thus, the processor 120 generates an output or indication of the one or more sensed parameters based on the wavelengths $\lambda_{B1}$ to $\lambda_{B6}$.

Figure 2A:
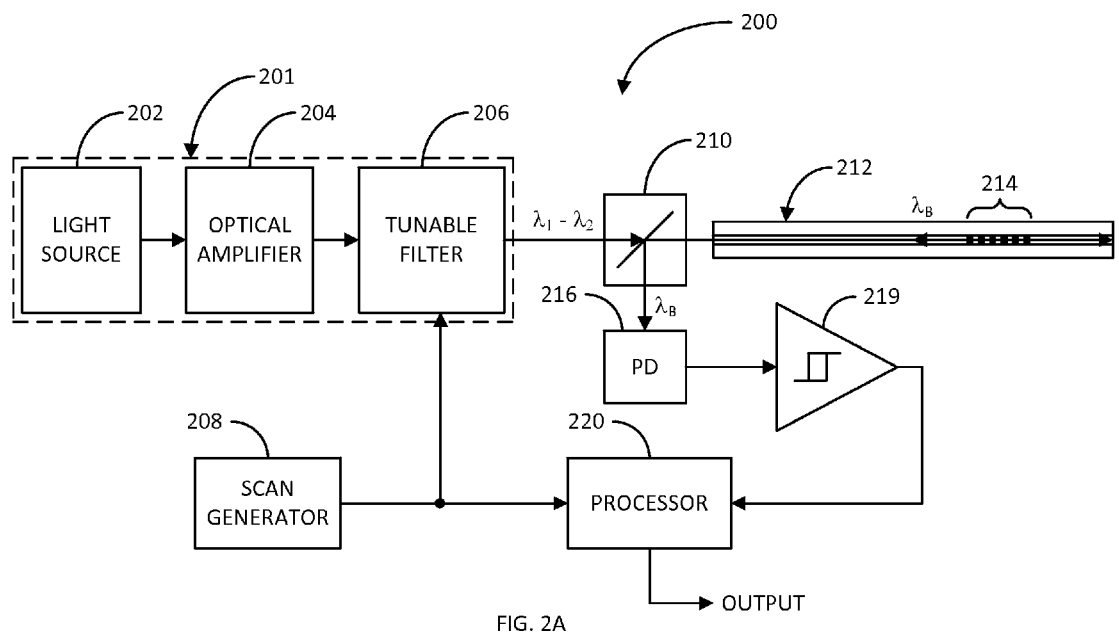
FIGS. 2A-2B illustrate a block diagram of another exemplary apparatus and associated signal timing diagram in accordance with another aspect of the disclosure.

FIG. 2A illustrates a block diagram of another exemplary apparatus 200 in accordance with another aspect of the disclosure. The apparatus 200 is similar to that of apparatus 100, and includes many of the same or similar elements as indicated by the same reference numbers, but with a "2" as the most significant digit rather than a "1". The detail discussion of such same or similar elements has been provided above with reference to apparatus 100. The apparatus 200 differs from that of apparatus 100 in that apparatus 200 includes a different type of comparator. That is, the apparatus 200 includes a comparator employing a defined threshold and hysteresis function (e.g., essentially mimicking upper and lower thresholds TH1 and TH2) that govern an output state of the comparator. An example of such comparator is a Schmitt trigger.

Although a single input threshold comparator (e.g., comparator 118) and a Schmitt trigger (e.g., comparator 219) are used to exemplify the invention, it shall be understood that other types of comparators may be used. Some examples include, but are not limited to: (1) a Schmitt-type input, with a fixed threshold and a fixed hysteresis; (2) a comparator with a single threshold input and externally configurable hysteresis; (3) a custom comparator using multiple inputs; and (4) any known or future configurations of comparing an analog input value to one or more known threshold values for the purpose of creating a digital output.

Referring again to FIG. 2A, the apparatus 200 comprises an SWL 201 including light source 202, optical amplifier 204, and tunable filter 206. The apparatus 200 further includes a scan generator 208, coupler 210, and optical fiber 212 including an FBG structure 214. Additionally, the apparatus 200 comprises a photo detector 216, a comparator 219, and a processor 220.

The comparator 219 generates a high logic-level from a low logic-level in response to the electrical signal from the photo detector 216 initially exceeding the upper threshold TH2. The comparator 219 continuous to generate the high logic-level as long as the electrical signal exceeds the lower threshold TH1. Once the electrical signal from the photo detector 216 falls below the lower threshold TH1, the comparator 219 generates the low logic-level. The comparator 219 is useful in combating noise that may be present in the electrical signal generated by the photo detector 216.

Figure 2B:
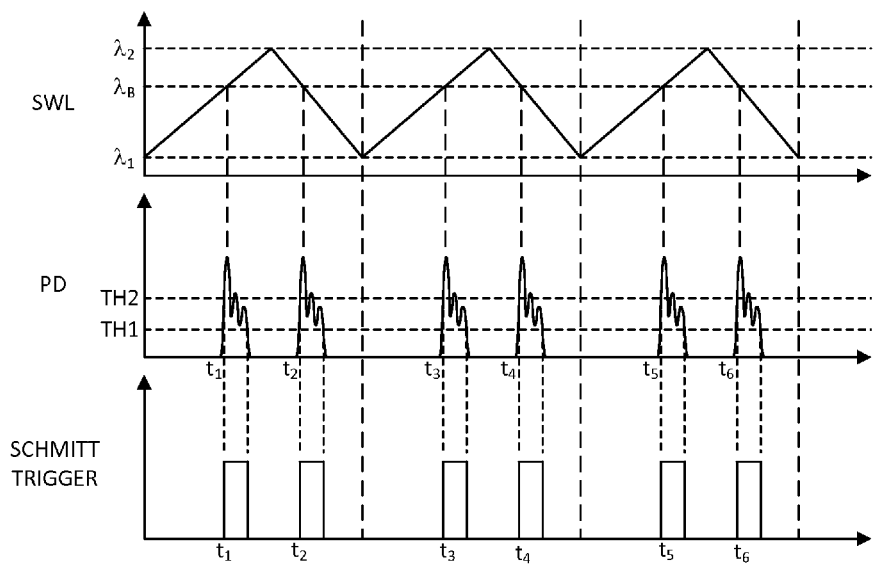

FIG. 2B illustrates a timing diagram of the signals associated with the operation of the apparatus 200 in accordance with another aspect of the disclosure. The signal timing diagram of apparatus 200 is similar to that of signal timing diagram of apparatus 100, except that noise is present in the electrical signal from the photo detector 216. Because of the dual threshold hysteresis response of the comparator 219, the comparator generates a single square wave pulse even though the electrical signal of the photo detector 216 crosses the upper threshold TH1 multiple times due to noise. The single pulse per reflected optical signal makes it easier for the processor 220 to determine the time of arrival of the reflected optical signal, and therefrom, the wavelength $\lambda_B$ of the reflected optical signal. As in the previous embodiment, the processor 220 generates an output or indication of one or more parameters sensed by the FBG structure 214 based on the determined wavelength $\lambda_B$ or time of arrival of the reflected optical signal.

For additional protection against noise, the processor 220 may be configured to employ a discrimination filtering of the signal generated by the comparator 219. In particular, the discrimination filtering may reject pulses from the comparator 219 having width shorter a defined minimum duration. This keeps any fast noise from setting off nuisance false positive detections. If the hysteresis effect of the comparator 219 is not sufficient to suppress all the unwanted noise, the discrimination filtering employed by the processor 220 provides the additional noise suppression.

Figure 3A:
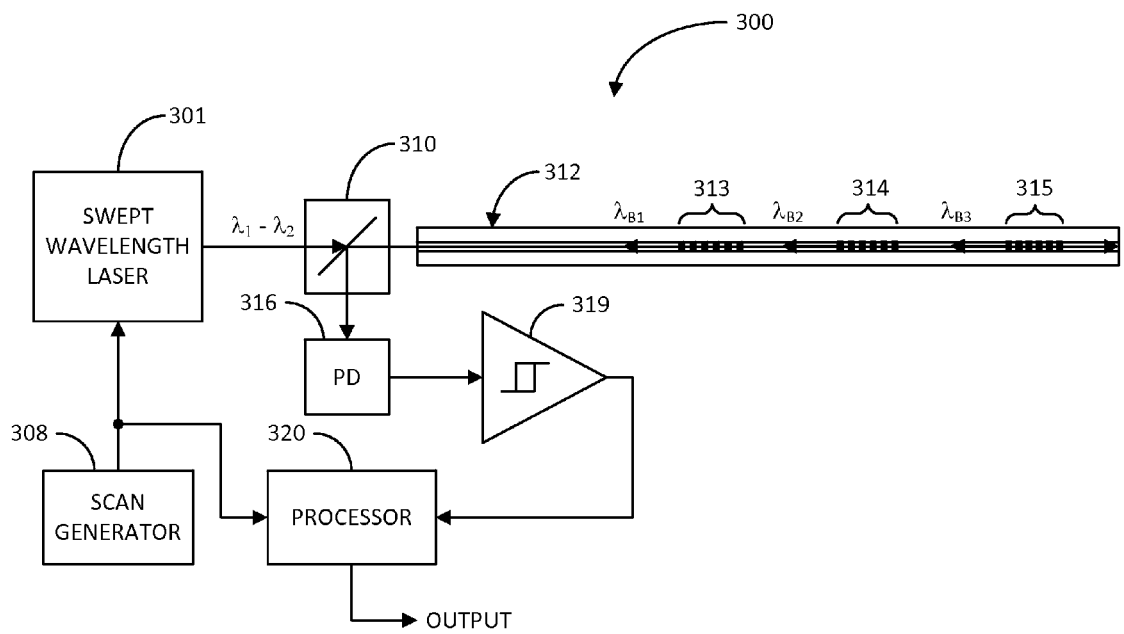
FIGS. 3A-3B illustrate a block diagram of another exemplary apparatus and associated signal timing diagram in accordance with another aspect of the disclosure.

FIG. 3A illustrates a block diagram of another exemplary apparatus 300 in accordance with another aspect of the disclosure. The apparatus 300 is similar to that of apparatuses 100 and 200, and includes many of the same or similar elements as indicated by the same reference numbers, but with a "3" as the most significant digit rather than a "2" or "1". The detail discussion of such same or similar elements has been provided above with reference to apparatuses 100 and 200. The apparatus 300 differs from that of apparatus 200 in that apparatus 300 includes an optical fiber that has a plurality of FBG structures. This allows a single optical fiber to be configured to measure a plurality of parameters located at different parts of a system.

More specifically, the apparatus 300 comprises an SWL 301, a scan generator 308, a coupler 310, and an optical fiber 312 including FBG structures 313, 314, and 315. Additionally, the apparatus 300 comprises a photo detector 316, a comparator 319, and a processor 320.

The FBG structures 313, 314, and 315 are configured to reflect optical signals at natural (when the sensed parameter is not influencing the wavelength) wavelengths $\lambda_{B1}$, $\lambda_{B2}$, and $\lambda_{B3}$, respectively. The natural wavelengths $\lambda_{B1}$, $\lambda_{B2}$, and $\lambda_{B3}$ of the FBG structures should be sufficiently spaced apart such that the corresponding electrical signals generated by the photo detector 316 do not interfere with each other in a manner that results in error in the measurement of the corresponding sensed parameters.

Figure 3B:
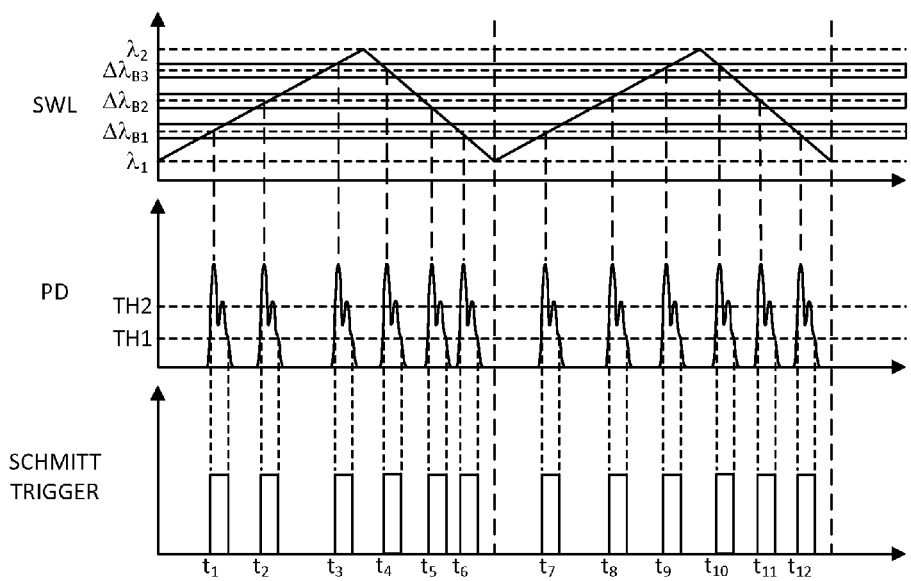

FIG. 3B illustrates a timing diagram of the signals associated with the operation of the apparatus 300 in accordance with another aspect of the disclosure. The signal timing diagram of apparatus 300 is similar to that of signal timing diagrams of apparatuses 100 and 200, except that for each "half" cycle of the scan signal, there are three (3) electrical signals generated (one for each of the reflected optical signals from FBG structures 313, 314, and 315, instead of one in the case of single FBG structure 114 and 214 in apparatuses 100 and 200, respectively).

The upper graph illustrates that a wavelength range is associated with a corresponding natural wavelength. For instance, wavelength ranges $\Delta\lambda_{B1}$, $\Delta\lambda_{B2}$, and $\Delta\lambda_{B3}$ are associated with natural wavelengths $\lambda_{B1}$, $\lambda_{B2}$, and $\lambda_{B3}$ of the FBG structures 313, 314, and 315, respectively. The wavelength ranges $\Delta\lambda_{B1}$, $\Delta\lambda_{B2}$, and $\Delta\lambda_{B3}$ are the possible wavelengths of optical signals reflected by the FBG structures 313, 314, and 315 as affected by the one or more parameters sensed by the FBG structures, respectively. As the upper graph illustrates, the wavelengths corresponding to times $t_1$ to $t_6$ are: at, below, above, at, below, and below the corresponding natural wavelengths, respectively. Similarly, the wavelengths corresponding to times $t_7$ to $t_{12}$ are: below, above, at, above, at, and below the corresponding natural wavelengths, respectively.

As previously discussed, the particular wavelengths of the reflected optical signals from the FBG structures 313, 314, and 315 affect the time of arrival of the signals at the photo detector 319. Thus, the time of arrivals $t_1$-$t_{12}$ depend on the wavelengths of the optical signals reflected by the FBG structures 313, 314, and 315 in the illustrated two scan cycle example shown in FIG. 3B. The comparator 319 "cleans" the output of the photo detector 316 to generate substantially square wave pulses at times $t_1$ to $t_{12}$. The processor 320 receives the pulses and generates an output or indication of the one or more parameters sensed by the FBG structures 313, 314, and 315 based on the times $t_1$ to $t_{12}$ and the scan signal, as previously discussed.

Figure 4:
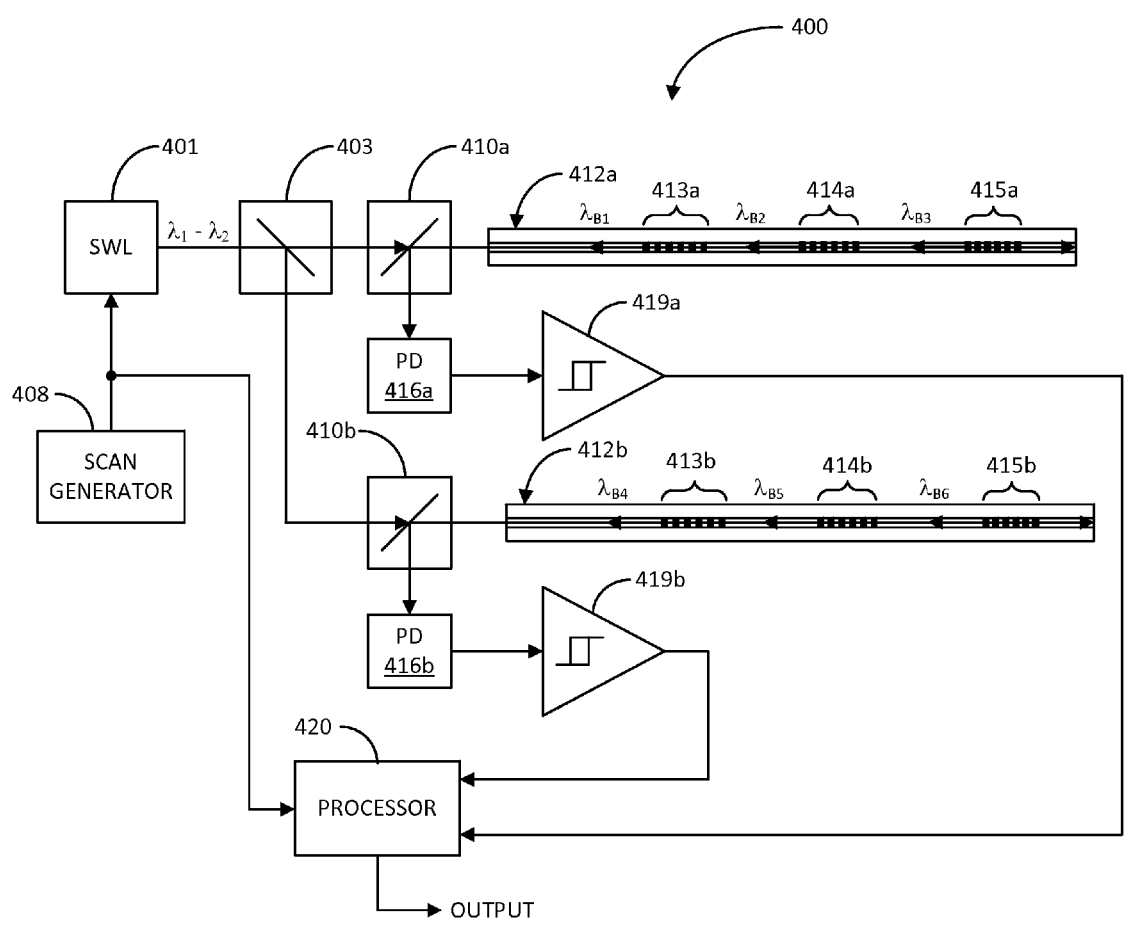
FIG. 4 illustrates a block diagram of yet another exemplary apparatus in accordance with another aspect of the disclosure.

FIG. 4 illustrates a block diagram of yet another exemplary apparatus 400 in accordance with another aspect of the disclosure. The apparatus 400 is similar to that of apparatus 300, and includes many of the same or similar elements as indicated by the same reference numbers, but with a "4" as the most significant digit rather than a "3". The detail discussion of such same or similar elements has been provided above with reference to apparatus 300. The apparatus 400 differs from that of apparatus 300 in that apparatus 400 includes two optical fibers connected in parallel, each having a plurality of FBG structures. Thus, optical fibers with FBG structures may be connected in parallel to increase the number of parameters of a system being sensed.

In particular, the apparatus 400 comprises an SWL 401, scan generator 408, optical splitter 403, couplers 410a and 410b, and optical fibers 412a and 412b including respective FBG structures 413a and 413b, 414a and 414b, and 415a and 415b. The apparatus 400 further comprises photo detectors 416a and 416b, comparators 419a and 419b, and processor 420.

The SWL 401 generates the sweeping optical signal ($\lambda_1$-$\lambda_2$) in accordance with the scan signal generated by the scan generator 408. The optical splitter 403 splits the sweeping optical signal into a first sweeping optical signal for optical fiber 412a and a second sweeping optical signal for optical fiber 412b. The first and second sweeping optical signals are applied to inputs of the optical fibers 412a and 412b by way of couplers 410a and 410b, respectively. In response to the sweeping optical signals, the FBG structures 413a, 414a, 415a, 413b, 414b, and 415b produce reflected optical signals with wavelengths ($\lambda_{B1}$, ($\lambda_{B2}$, ($\lambda_{B3}$, ($\lambda_{B4}$, ($\lambda_{B5}$, and ($\lambda_{B6}$, respectively.

The reflected optical signals from FBG structures 413a, 414a, and 415a propagate to photo detector 416a by way of coupler 410a. Similarly, the reflected optical signals from FBG structures 413b, 414b, and 415b propagate to photo detector 416b by way of coupler 410b. As previously discussed, the photo detector 416a and corresponding comparator 419a are configured to generate substantially square wave pulses corresponding to the times the reflected optical signals from FBG structures 413a, 414a, and 415a are received by the photo detector 416a. Similarly, the photo detector 416b and corresponding comparator 419b are configured to generate substantially square wave pulses corresponding to the times the reflected optical signals from FBG structures 413b, 414b, and 415b are received by the photo detector 416b.

The processor 420 is configured to receive the square wave pulses from the comparators 419a and 419b. The processor 420 generates an output including indications related to the one or more parameters sensed by the FBG structures 413a, 414a, 415a, 413b, 414b, and 415b based on the times the processor receives the pulses from the comparators 419a and 419b, and the scan signal.

Figure 5:
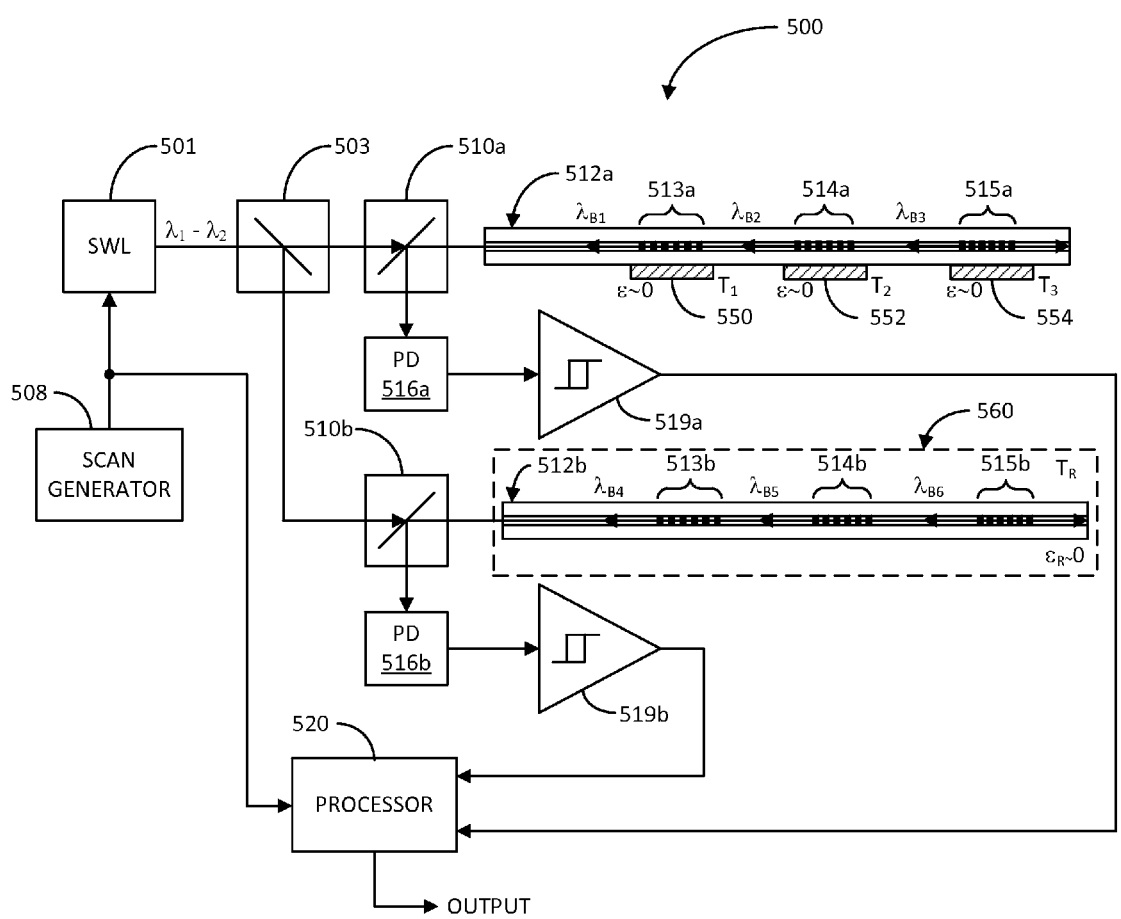
FIG. 5 illustrates a block diagram of still another exemplary apparatus in accordance with another aspect of the disclosure.

FIG. 5 illustrates a block diagram of still another exemplary apparatus 500 in accordance with another aspect of the disclosure. The apparatus 500 is similar to that of apparatus 400, and includes many of the same or similar elements as indicated by the same reference numbers, but with a "5" as the most significant digit rather than a "4". The detail discussion of such same or similar elements has been provided above with reference to apparatus 400. The apparatus 500 differs from that of apparatus 400, in that one of the optical fibers of apparatus 500 is used as a reference subjected to a controlled temperature $T_R$ and mechanical strain $\epsilon_R$ environment (e.g., $T_R$ and $\epsilon_R$ are substantially constant (e.g., $\epsilon_R\sim 0$)).

In particular, the apparatus 500 comprises an SWL 501, scan generator 508, optical splitter 503, couplers 510a and 510b, a sensing optical fiber 512a including FBG structures 513a, 514a, and 515a, and a reference optical fiber 512b including FBG structures 513b, 514b, and 515b. The apparatus 500 further comprises photo detectors 516a and 516b, comparators 519a and 519b, and processor 520.

The SWL 501 generates the sweeping optical signal (($\lambda_1$-($\lambda_2$) in accordance with the scan signal generated by the scan generator 508. The optical splitter 503 splits the sweeping optical signal into a first sweeping optical signal for sensing optical fiber 512a and a second sweeping optical signal for reference optical fiber 512b. The first and second sweeping optical signals are applied to inputs of optical fibers 512a and 512b by way of couplers 510a and 510b, respectively. In response to the sweeping optical signals, the FBG structures 513a, 514a, 515a, 513b, 514b, and 515b produce reflected optical signals with wavelengths $\lambda_{B1}$, $\lambda_{B2}$, $\lambda_{B3}$, $\lambda_{B4}$, $\lambda_{B5}$, and $\lambda_{B6}$, respectively.

The FBG structures 513a, 514a, and 515a of the sensing optical fiber 512a are configured to sense the temperatures $T_1$, $T_2$, and $T_3$ of certain components 550, 552, and 554 of a system, respectively. In this example, the components 550, 552, and 554 do not impart any significant mechanical strain (e.g., $\epsilon_R \sim 0$) on the FBG structures 513a, 514a, and 515a, respectively. The reference optical fiber 512b is situated within a separate temperature and strain controlled environment 560. Thus, the wavelengths $\lambda_{B1}$, $\lambda_{B2}$, and $\lambda_{B3}$ of the reflected optical signals of the sensing optical fiber 512a varies with the temperatures T1, T2, and T3 of the components 550, 552, and 554, which depend on heat emitted by the components. The wavelengths $\lambda_{B4}$, $\lambda_{B5}$, and $\lambda_{B6}$ of the reflected optical signals of the reference optical fiber 512b is substantially constant due to the controlled temperature and strain environment 560.

The reflected optical signals from FBG structures 513a, 514a, and 515a propagate to photo detector 516a by way of coupler 510a. Similarly, the reflected optical signals from FBG structures 513b, 514b, and 515b propagate to photo detector 516b by way of coupler 510b. As previously discussed, the photo detector 516a and corresponding comparator 519a are configured to generate substantially square wave pulses corresponding to the times the reflected optical signals from FBG structures 513a, 514a, and 515a are received by the photo detector 516a. Similarly, the photo detector 516b and corresponding comparator 519b are configured to generate substantially square wave pulses corresponding to the times the reflected optical signals from FBG structures 513b, 514b, and 515b are received by the photo detector 516b.

The processor 520 is configured to receive the square wave pulses from the comparators 519a and 519b. The processor 520 generates an output including indications related to the temperatures $T_1$, $T_2$, and $T_3$ (e.g., $\Delta_1 = T_1 - T_R$, $\Delta 2 = T_2 - T_R$, and $\Delta 3 = T_3 - T_R$) based on the scan signal from the scan generator 508, and the time differences between the times the processor 520 receives the pulses from comparator 519a and the times the processor 520 receives the pulses from comparator 519b, respectively.

Figure 6:
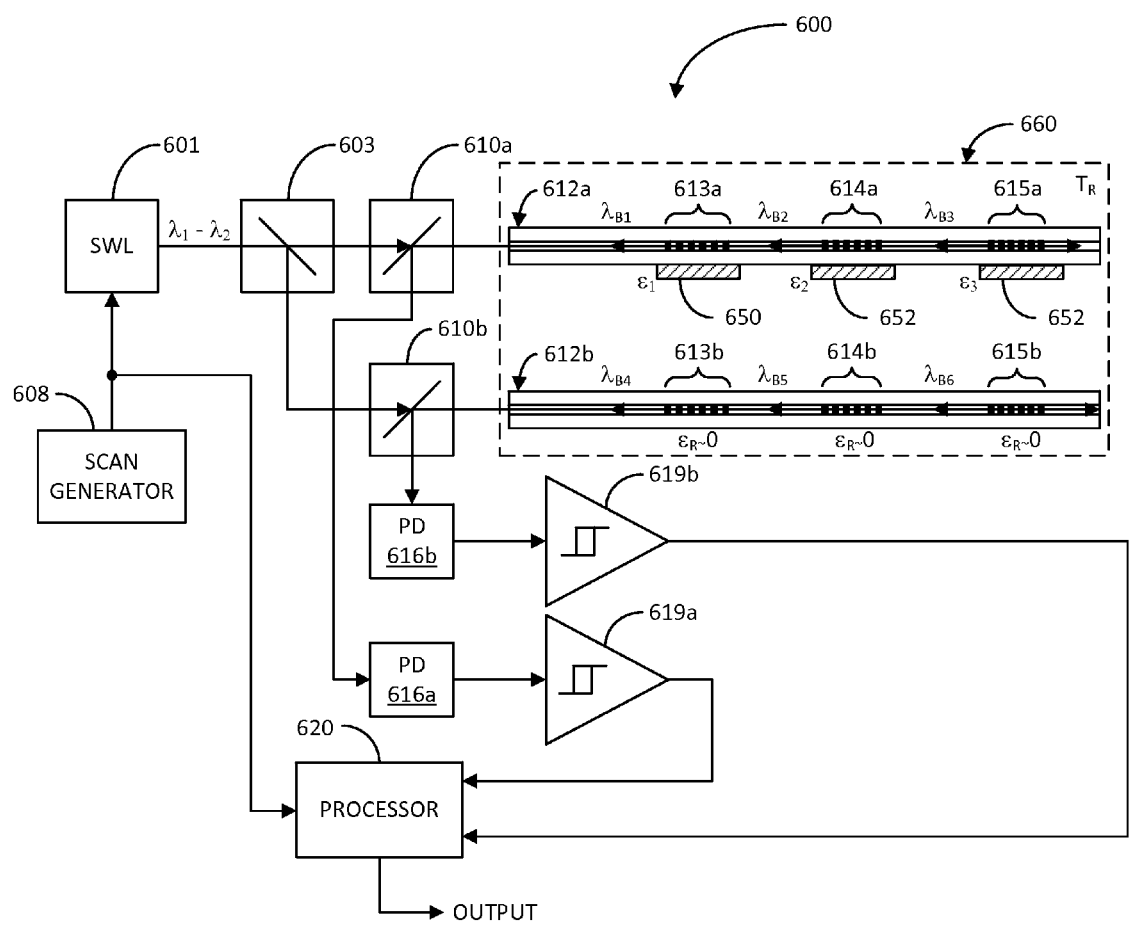
FIG. 6 illustrates a block diagram of an additional exemplary apparatus in accordance with another aspect of the disclosure.

FIG. 6 illustrates a block diagram of an additional exemplary apparatus 600 in accordance with another aspect of the disclosure. The apparatus 600 is similar to that of apparatus 500, and includes many of the same or similar elements as indicated by the same reference numbers, but with a "6" as the most significant digit rather than a "5". The detail discussion of such same or similar elements has been provided above with reference to apparatus 500. The apparatus 600 differs from that of apparatus 500, in that one of the optical fibers of apparatus 600 is used as a reference subjected to substantially the same reference temperature $T_R$ as a sensing optical fiber, but not subjected to any mechanical strain (e.g., a reference strain $\epsilon_R \sim 0$).

In particular, the apparatus 600 comprises an SWL 601, scan generator 608, optical splitter 603, couplers 610a and 610b, a sensing optical fiber 612a including FBG structures 613a, 614a, and 615a, and a reference optical fiber 612b including FBG structures 613b, 614b, and 615b. The apparatus 600 further comprises photo detectors 616a and 616b, comparators 619a and 619b, and processor 620.

The SWL 601 generates the sweeping optical signal ($\lambda_1$-$\lambda_2$) in accordance with the scan signal generated by the scan generator 608. The optical splitter 603 splits the sweeping optical signal into a first sweeping optical signal for sensing optical fiber 612a and a second sweeping optical signal for reference optical fiber 612b. The first and second sweeping optical signals are applied to inputs of optical fibers 612a and 612b by way of couplers 610a and 610b, respectively. In response to the sweeping optical signals, the FBG structures 613a, 614a, 615a, 613b, 614b, and 615b produce reflected optical signals with wavelengths $\lambda_{B1}$, $\lambda_{B2}$, $\lambda_{B3}$, $\lambda_{B4}$, $\lambda_{B5}$, and $\lambda_{B6}$, respectively.

The FBG structures 613a, 614a, and 615a of the sensing optical fiber 612a are configured to sense mechanical strain $\epsilon_1$, $\epsilon_2$, and $\epsilon_3$ upon certain components 650, 652, and 654 of a system, respectively. The sensing and reference optical fibers 612a and 612b are situated within an environment 660 that subjects both optical fibers to substantially the same reference temperature TR. Thus, the wavelengths $\lambda_{B1}$, $\lambda_{B2}$, and $\lambda_{B3}$ of the reflected optical signals of the sensing optical fiber 612a vary with the mechanical strain $\epsilon_1$, $\epsilon_2$, and $\epsilon_3$ upon components 650, 652, and 654 of a system and the reference temperature. The wavelengths $\lambda_{B4}$, $\lambda_{B5}$, and $\lambda_{B6}$ of the reflected optical signals of the reference optical fiber 612b varies only with the reference temperature $T_R$, as the reference mechanical strain $\epsilon_R$ is substantially zero (0).

The reflected optical signals from FBG structures 613a, 614a, and 615a propagate to photo detector 616a by way of coupler 610a. Similarly, the reflected optical signals from FBG structures 613b, 614b, and 615b propagate to photo detector 616b by way of coupler 610b. As previously discussed, the photo detector 616a and corresponding comparator 619a are configured to generate substantially square wave pulses corresponding to the times the reflected optical signals from FBG structures 613a, 614a, and 615a are received by the photo detector 616a. Similarly, the photo detector 616b and corresponding comparator 619b are configured to generate substantially square wave pulses corresponding to the times the reflected optical signals from FBG structures 613b, 614b, and 615b are received by the photo detector 616b.

The processor 620 is configured to receive the square wave pulses from the comparators 619a and 619b. The processor 620 generates an output including indications related to the strain $\epsilon_1$, $\epsilon_2$, and $\epsilon_3$ upon components 650, 652, and 654 based on the scan signal from the scan generator 608, and the time differences between the times the processor 620 receives the pulses from comparator 619a and the times the processor 620 receives the pulses from comparator 619b, respectively.

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. An apparatus, comprising:
   a sweeping wavelength laser (SWL) configured to generate a sweeping wavelength optical signal;
   an optical fiber including a Fiber Bragg Grating (FBG) structure configured to sense a parameter, wherein the optical fiber is configured to receive the sweeping wavelength optical signal, wherein the FBG structure is configured to produce a reflected optical signal with a particular wavelength in response to the sweeping wavelength optical signal, and wherein the particular wavelength varies as a function of the parameter;

a photo detector configured to generate an electrical signal based on the reflected optical signal;

a comparator configured to generate a pulse based on a comparison of the electrical signal to a first threshold, wherein the comparator is configured to generate the pulse by at least:
producing a high logic level in response to the electrical signal rising above the first threshold; and
producing a low logic level in response to the electrical signal falling below a second threshold; and a processor configured to generate an indication of the parameter based on the pulse.

2. The apparatus of claim 1, wherein the comparator comprises a Schmitt trigger.

3. The apparatus of claim 1, wherein the indication of the parameter is based on a timing at which the processor receives the pulse.

4. The apparatus of claim 1, further comprising a scan generator configured to generate a scan signal for controlling the sweeping wavelength optical signal.

5. The apparatus of claim 4, wherein the processor is configured to generate the indication of the parameter based on the scan signal and the pulse.

6. The apparatus of claim 4, wherein the sweeping wavelength laser (SWL) comprises:
a light source configured to generate a light having a defined range of wavelengths; and
a tunable filter configured to generate the sweeping wavelength optical signal by wavelength filtering the light in accordance with the scan signal.

7. The apparatus of claim 4, wherein the sweeping wavelength laser (SWL) further comprises:
a light source configured to generate a light having a defined range of wavelengths;
an optical amplifier configured to amplify the light; and
a tunable filter configured to generate the sweeping wavelength optical signal by wavelength filtering the amplified light in accordance with the scan signal.

8. The apparatus of claim 1, wherein the optical fiber includes other one or more FBG structures for sensing other one or more parameters, wherein the other one or more FBG structures are configured to produce other one or more reflected optical signals with other one or more particular wavelengths in response to the sweeping wavelength optical signal, and wherein the other one or more particular wavelengths varies as a function of other one or more parameters, respectively;
wherein the photo detector is configured to generate other one or more electrical signals based on the other one or more reflected optical signals, respectively;
wherein the comparator is configured to generate other one or more pulses based on a comparison of the other one or more electrical signals to the first threshold; and
wherein the processor is configured to generate other one or more indications of the other one or more parameters based on the other one or more pulses, respectively.

9. The apparatus of claim 1, wherein the parameter comprises temperature, strain, or pressure.

10. An apparatus, comprising:
a sweeping wavelength laser (SWL) configured to generate a sweeping wavelength optical signal;
an optical fiber including a Fiber Bragg Grating (FBG) structure configured to sense a parameter, wherein the optical fiber is configured to receive the sweeping wavelength optical signal, wherein the FBG structure is configured to produce a reflected optical signal with a particular wavelength in response to the sweeping wavelength optical signal, and wherein the particular wavelength varies as a function of the parameter;
a photo detector configured to generate an electrical signal based on the reflected optical signal;
a comparator configured to generate a pulse based on a comparison of the electrical signal to a first threshold;
a processor configured to generate an indication of the parameter based on the pulse;
a second optical fiber including a second FBG structure configured to sense a second parameter, wherein the second optical fiber is configured to receive the sweeping wavelength optical signal, wherein the second FBG structure is configured to produce a second reflected optical signal with a second particular wavelength in response to the sweeping wavelength optical signal, and wherein the second particular wavelength varies as a function of the second parameter;
a second photo detector configured to generate a second electrical signal based on the second reflected optical signal; and
a second comparator configured to generate a second pulse based on a comparison of the second electrical signal to a second threshold.

11. The apparatus of claim 10, wherein the processor is configured to generate a second indication of the second parameter based on the second pulse.

12. The apparatus of claim 10, wherein the processor is configured to generate the indication of the parameter based on the second pulse.

13. An apparatus of, comprising:
a sweeping wavelength laser (SWL) configured to generate a sweeping wavelength optical signal;
an optical fiber including a Fiber Bragg Grating (FBG) structure configured to sense a parameter, wherein the optical fiber is configured to receive the sweeping wavelength optical signal, wherein the FBG structure is configured to produce a reflected optical signal with a particular wavelength in response to the sweeping wavelength optical signal, and wherein the particular wavelength varies as a function of the parameter;
a photo detector configured to generate an electrical signal based on the reflected optical signal;
a comparator configured to generate a pulse based on a comparison of the electrical signal to a first threshold;
a processor configured to generate an indication of the parameter based on the pulse, wherein the processor is configured to reject one or more pulses generated by the comparator in the generation of the indication of the parameter, wherein the one or more rejected pulses each have a width shorter than a defined duration.

14. An apparatus, comprising:
a light source producing an incident optical signal with a wavelength varying in a defined time manner;
an optical fiber including a Fiber Bragg Grating (FBG) structure configured to sense a parameter, wherein the optical fiber is configured to receive the incident optical signal, wherein the FBG structure is configured to produce a reflected optical signal with a particular wavelength in response to the incident optical signal, and wherein the particular wavelength varies as a function of the parameter;

a photo detector configured to generate an electrical signal based on the reflected optical signal;

a comparator configured to generate a signal based on a comparison of the electrical signal to a first threshold, wherein the comparator is configured to generate the signal by at least:

producing a high logic level in response to the electrical signal rising above the first threshold; and producing a low logic level in response to the electrical signal falling below a second threshold; and a processor configured to generate an indication of the parameter based on the signal.

15. The apparatus of claim 14, wherein the comparator comprises a Schmitt trigger.

16. An apparatus, comprising:

a light source producing an incident optical signal with a wavelength varying in a defined time manner;

a first optical fiber including a first Fiber Bragg Grating (FBG) structure configured to sense a first parameter, wherein the first optical fiber is configured to receive the incident optical signal, wherein the first FBG structure is configured to produce a first reflected optical signal with a first particular wavelength in response to the incident optical signal, and wherein the first particular wavelength varies as a function of the first parameter;

a first photo detector configured to generate a first electrical signal based on the first reflected optical signal;

a first comparator configured to generate a first signal based on a comparison of the first electrical signal to a first threshold;

a second optical fiber including a second FBG structure configured to sense a second parameter, wherein the second optical fiber is configured to receive the incident optical signal, wherein the second FBG structure is configured to produce a second reflected optical signal with a second particular wavelength in response to the incident optical signal, and wherein the second particular wavelength varies as a function of the second parameter;

a second photo detector configured to generate a second electrical signal based on the second reflected optical signal;

a second comparator configured to generate a second signal based on a comparison of the second electrical signal to a second threshold; and a processor configured to generate an indication of the parameter based on the first and second signals.

* * * * *